United States Patent
Sung et al.

(10) Patent No.: US 7,874,889 B2
(45) Date of Patent: Jan. 25, 2011

(54) PRINTING BEAD SPACERS ON FLAT PANEL DISPLAY SUBSTRATES

(75) Inventors: Byoung-Hun Sung, Seoul (KR); Jeong-Uk Heo, Seongnam-si (KR); Bong-Sung Seo, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1072 days.

(21) Appl. No.: 11/641,371

(22) Filed: Dec. 18, 2006

(65) Prior Publication Data

US 2007/0263165 A1     Nov. 15, 2007

(30) Foreign Application Priority Data

May 9, 2006   (KR) ...................... 10-2006-0041353

(51) Int. Cl.
*H01J 9/00*    (2006.01)
*G02F 1/13*    (2006.01)

(52) U.S. Cl. ........................................ 445/23; 349/187
(58) Field of Classification Search ............. 445/23–25; 349/187, 130, 86–93
See application file for complete search history.

(56) References Cited

U.S. PATENT DOCUMENTS

2002/0075443 A1    6/2002    Shimizu et al.

FOREIGN PATENT DOCUMENTS

| JP | 11-65479 | 3/1999 |
| JP | 2004-275956 | 10/2004 |
| KR | 10-2004-0036645 | 4/2004 |
| KR | 10-2004-0082281 | 9/2004 |
| KR | 10-0459232 | 11/2004 |
| KR | 10-2005-0121882 | 12/2005 |
| KR | 10-2006-0005543 | 1/2006 |

OTHER PUBLICATIONS

Patent Abstracts of Japan, Publication No. 11-065479, Mar. 5, 1999, 1 p.
Patent Abstracts of Japan, Publication No. 2004-275956, Oct. 7, 2004, 1 p.
Korean Patent Abstracts, Publication No. 1020040036645, Apr. 30, 2004, 1 p.
Korean Patent Abstracts, Publication No. 1020040051004, Jun. 18, 2004, 1 p.
Korean Patent Abstracts, Publication No. 1020040082281, Sep. 24, 2004; 2 pp.
Korean Patent Abstracts, Publication No. 1020050121882, Dec. 28, 2005, 2 pp.
Korean Patent Abstracts, Publication No. 1020060005543, Jan. 18, 2006, 2 pp.

*Primary Examiner*—Joseph L Williams
(74) *Attorney, Agent, or Firm*—Innovation Counsel LLP

(57) ABSTRACT

An apparatus for printing bead spacers on a substrate of an LCD panel includes a head unit for spraying a plurality of bead spacer groups on the substrate, a transfer unit for transferring the head unit, and a supply unit for supplying the bead spacers to the head unit. Each of the bead spacer groups includes a plurality of bead spacers, and the sizes of the respective spacers of at least two of the spacer groups are different from each other. The invention enables a cell gap of a substantially uniform thickness to be created and maintained in the panel, prevents the occurrence of smear failures in the panel, and increases the allowable tolerance in the amount of liquid crystal material needed to fill the panel correctly.

13 Claims, 9 Drawing Sheets

PRINTING BEAD SPACERS ON FLAT PANEL DISPLAY SUBSTRATES

RELATED APPLICATIONS

This application claims priority of Korean Patent Application No. 10-2006-0041353, filed May 9, 2006, the entire contents of which are incorporated herein by reference.

BACKGROUND

This invention relates to methods and apparatus for printing bead spacers on the substrates of liquid crystal display (LCD) panels.

LCDs are currently the most widely used type of flat panel display, and typically comprise a display panel having two substrates on which field generating electrodes are formed, and between which a layer of liquid crystal material is sealed. The panel adjusts the transmittance of light passing through the liquid crystal layer by rearranging the molecules of the liquid crystal layer through the application of selected voltages to the electrodes.

The upper and lower substrates of an LCD panel are coupled together with a sealant that extends around a peripheral edge of the two substrates, and which seals the liquid crystal material between them, and a plurality of spacers are disposed between the upper and lower substrates to define a space with a closely controlled height, called a "cell gap," between the two substrates.

The spacers may be comprise spherical "bead"-type spacers or "columnar"-type spacers that are disposed in a fixed pattern between the two substrates.

The columnar spacers are preferably formed in regions of the display panel through which the passage of light is blocked, for example, at the channel parts of thin film transistors (TFTs), gate lines, storage electrode lines, and the like, by coating a photosensitive film on a color filter array substrate of the panel and then exposing and developing it. The bead spacers, on the other hand, are typically formed by randomly spraying them onto one of the substrates before the two substrates are sandwiched together.

However, when bead spacers are simply sprayed randomly onto one of the display substrates, the spacers can act like particles of a foreign substance that adversely affect the contrast ratio of the display by allowing light to leak through them. Additionally, it is possible for some of the bead spacers to move slightly and thereby cause damage to an alignment layer of the panel.

On the other hand, the use of columnar-type spacers results in an increase in the number of manufacturing processes required to make the panel, thereby increasing panel cost. Additionally, unlike bead spacers, which are made of a plastic having a relatively high elasticity, columnar spacers have a relatively low elasticity, and as a result, the allowable tolerance in the amount of liquid crystal material needed to correctly fill the space between two the substrates decreases. As a result, it is easily possible to produce panels that are imperfectly or excessively charged with the liquid crystal material. Further, because of their low elasticity, when an excessive pressure is applied to columnar spacers, the display can easily develop a "smear" fault, in which the columnar spacers or the color filters disposed below them are broken.

BRIEF SUMMARY

In accordance with the exemplary embodiments thereof described herein, the present invention provides methods and apparatus for printing spacers on a substrate of an LCD panel that increase the allowable tolerance in the amount of liquid crystal material needed to correctly fill the panel and the substantially decrease the incidence of display panel smear failures. The invention therefore enables the advantages of both bead spacers and columnar spacers to be obtained without experiencing the disadvantages of either.

In one exemplary embodiment thereof, an apparatus for printing bead spacers on an LCD substrate in accordance with the present invention comprises a head unit for spraying a plurality of groups of bead spacers on the substrate, a transfer unit for transferring the head unit relative to the substrate, and a plurality of supply units for supplying the bead spacers to the head unit. The bead spacer groups are sprayed on the substrate together with an adhesive that is curable by heat or ultraviolet light.

Each of the spacer groups includes a plurality of bead spacers, and the size of the spacers in at least one of the groups may be substantially the same or different from that of the spacers in at least one of the other groups. The material of the spacers in at least one of the groups may be the same as or different from that of the spacers of at least one of the other groups. The size of the spacers supplied by at least one of the supply units may be substantially the same as or different from the size of the spacers supplied by at least one of the other supply units.

The head unit comprises at least one inkjet head having a plurality of nozzle groups. Each nozzle group includes a plurality of nozzles, and the size of the respective nozzles of at least two of the nozzle groups may be substantially the same or may be different from each other. The nozzles of at least two nozzle groups may be disposed alternately with each other in the inkjet head. The sizes of the respective bead spacers sprayed from the at least two nozzle groups may be substantially the same as or different from each other.

In one exemplary embodiment, the inkjet head of the apparatus includes first and second inkjet heads having first and second nozzle groups respectively formed therein, and the size of a nozzle of the first nozzle group and the size of a nozzle of the second nozzle group are different from each other.

An exemplary embodiment of a method for manufacturing an LCD includes spraying a first bead spacer group through a first nozzle group of a head unit on a first substrate of the LCD, spraying a second bead spacer group through a second nozzle group of a head unit on the first substrate, and coupling a second substrate in spaced opposition to the first substrate.

The head unit includes one or more inkjet heads. The first nozzle group may be formed in one inkjet head, and the second nozzle group may be formed in another inkjet head. Alternatively, the first and second nozzle groups may both be formed in one inkjet head.

The exemplary method may further include supplying the first and second bead spacers to the head unit from respective first and second supply units. The first and second bead spacer groups may be sprayed on the first substrate along with an adhesive, which may be a thermosetting or an ultraviolet hardening adhesive, and accordingly, the method may further include applying heat or ultraviolet light to the first substrate after the first and second bead spacer groups have been sprayed thereon to cure the adhesive.

The first bead spacer group may include a plurality of first bead spacers and the second bead spacer group may include a plurality of second bead spacers, and the respective sizes, materials or both the respective sizes and materials of the first and second bead spacers may be different from each other. The first and second bead spacer groups may be formed on a light blocking member, and such that they do not overlap each other. The first bead spacer group may be positioned in a central part of the first substrate, and the second spacer group may be positioned in a peripheral part of the first substrate.

The density of the first bead spacer group may be ⅙ of the pixel density of the display panel, the density of the second bead spacer group may be ⅙ of the pixel density, and the first and second bead spacer groups may be spaced apart from each other by a selected distance.

Yet another exemplary embodiment of a bead spacer printing apparatus of the present invention includes a head unit for spraying a plurality of bead spacer groups on a substrate, a transfer unit for transferring the head unit, and a plurality of supply units for supplying the bead spacer groups to the head unit. Each of the bead spacer groups includes a plurality of bead spacers, and the bead spacers that are included in the groups are of at least two different kinds. Each of the bead spacer groups may include at least two sizes of bead spacers, or each of the bead spacer groups may include at least one bead spacer made of a first material and at least one bead spacer made of a second material.

Yet another exemplary embodiment of a method for manufacturing an LCD includes supplying at least two kinds of bead spacers in a supply unit, spraying the at least two kinds of bead spacers on a first substrate through a nozzle of a head unit that is connected to a supply unit, and coupling a second substrate in spaced opposition to the first substrate.

A better understanding of the above and many other features and advantages of the LCD substrate bead spacer printing methods and apparatus of the present invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

Figure 1:
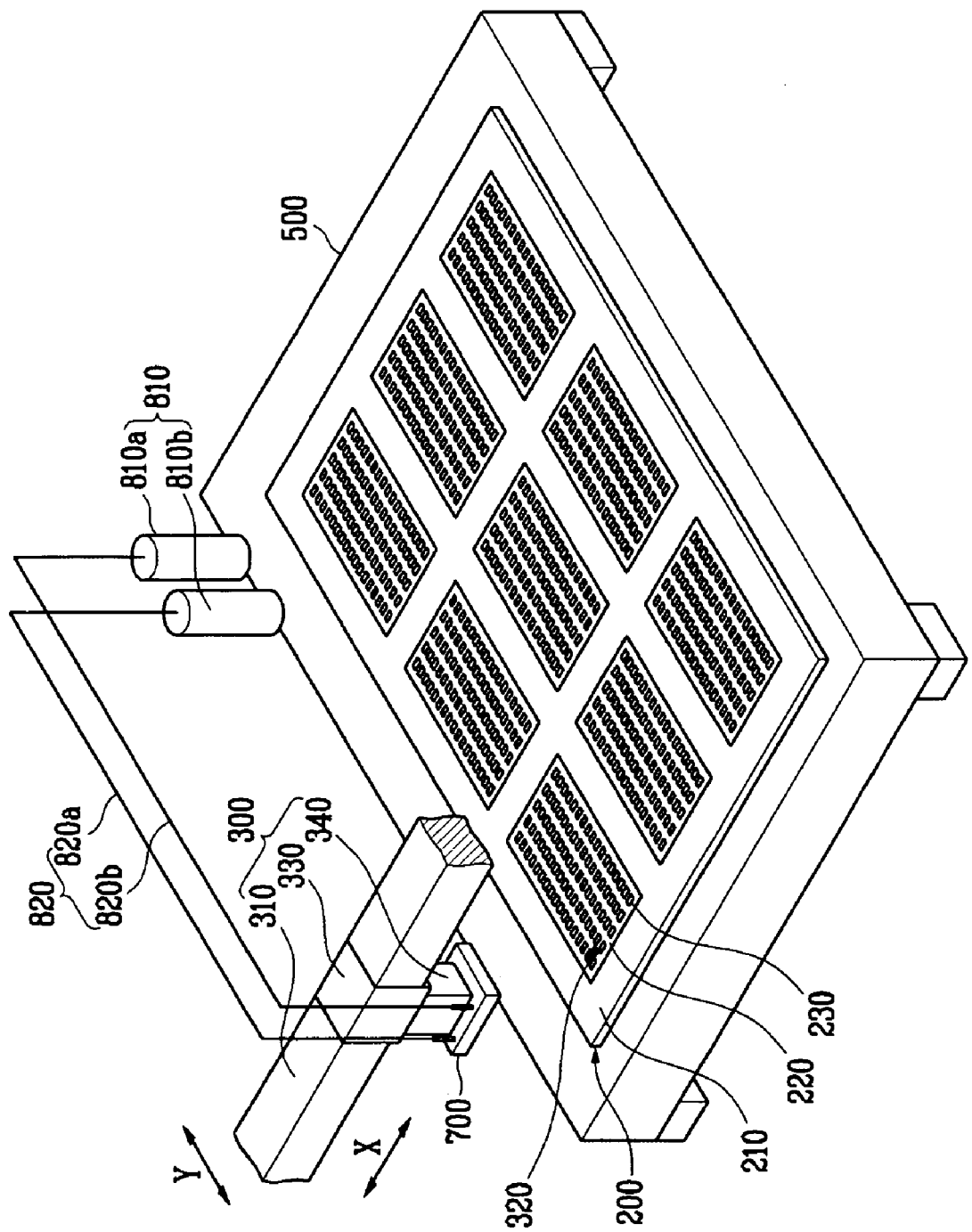
FIG. 1 is an upper side perspective view of an exemplary embodiment of an apparatus for printing bead spacers on a substrate of an LCD in accordance with the present invention.
Figure 2:
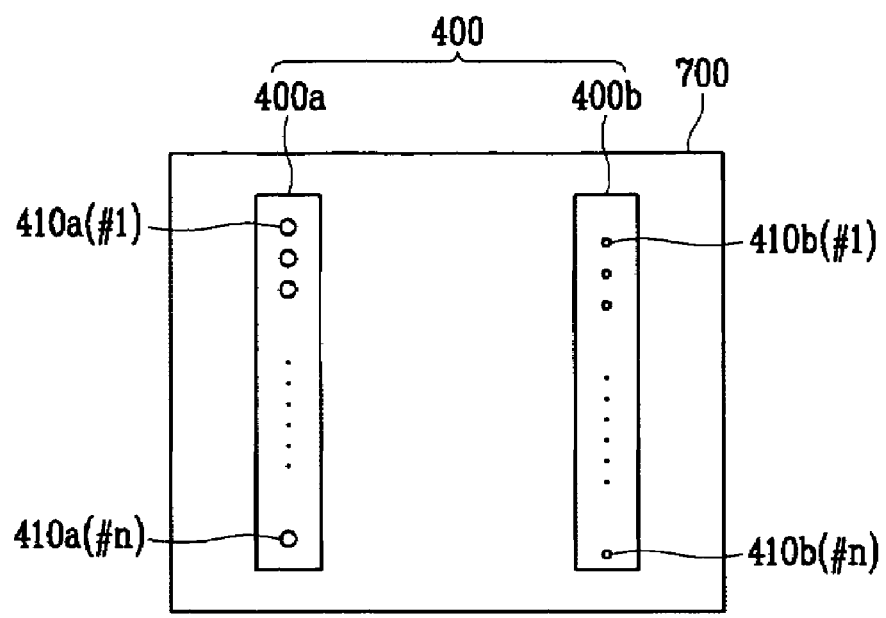
FIGS. 2-4 are bottom plan views of respective exemplary embodiments of a head unit of the spacer printing apparatus of FIG. 1.
Figure 3:
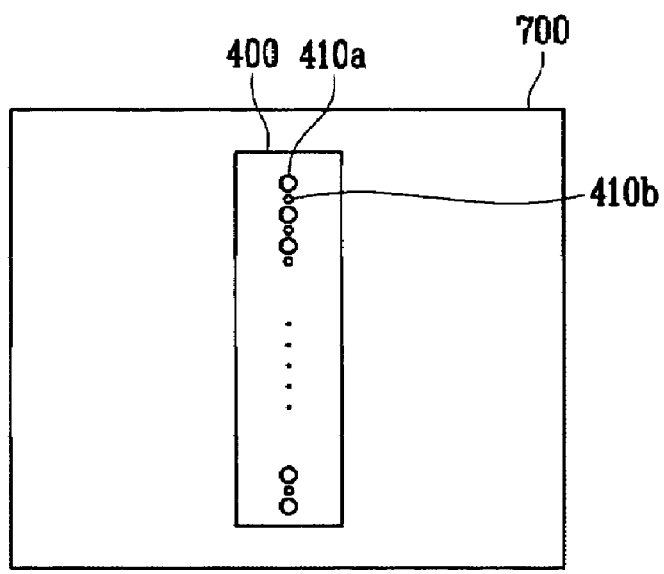
Figure 4:
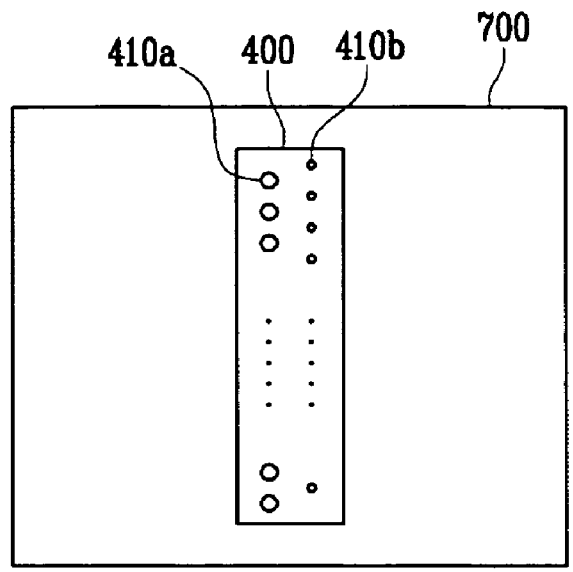
Figure 5:
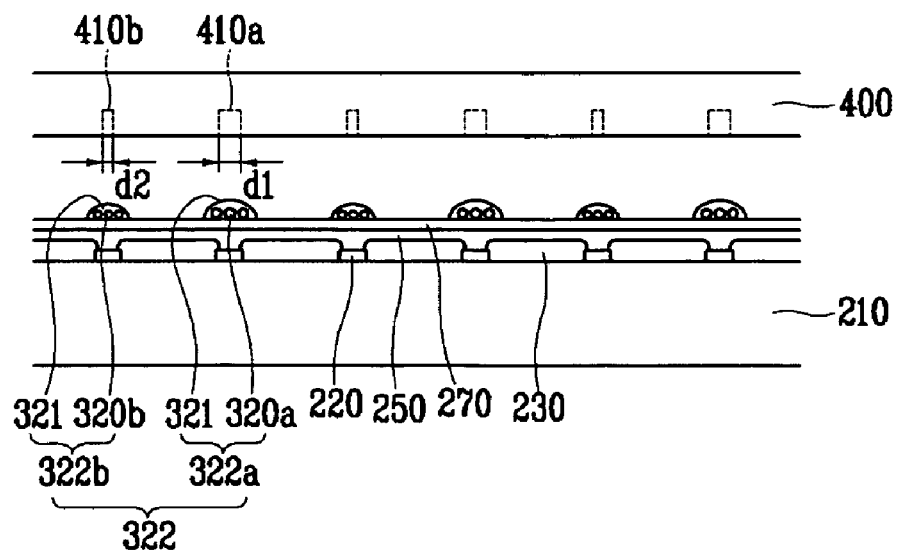
FIG. 5 is a partial cross-sectional view of an LCD substrate, showing bead spacers being sprayed thereon with the apparatus.

FIG. 1 is an upper side perspective view of an exemplary embodiment of an apparatus for printing bead spacers on a substrate of an LCD in accordance with the present invention, and FIGS. 2-4 are bottom plan views of respective exemplary embodiments of the inkjet heads 400 of a head unit 700 of the spacer printing apparatus of FIG. 1. FIG. 5 is a partial cross-sectional view of an LCD substrate 210, showing bead spacers being sprayed on the substrate with the novel apparatus.

As illustrated in FIG. 1, the exemplary bead spacer printing apparatus includes a head unit 700 for spraying bead spacers 320 on a substrate 210 of an LCD, a transfer unit 300 for selectably transferring the head unit 700 relative to the substrate 210, and a supply unit 810 for supplying the bead spacers 320 to the head unit 700. The head unit 700 is disposed at a selected height above a stage 500 on which the substrate 210 is mounted. As illustrated in FIGS. 2-4, the head unit 700 includes at least one inkjet head 400. A head unit 700 having two inkjet heads is illustrated in FIG. 2, and head units 700 having only one inkjet head each are illustrated in FIGS. 3 and 4, respectively.

A plurality of nozzles 410*a* and 410*b* are formed in the bottom of the inkjet heads 400, which have an elongated, or bar-like shape, and the first nozzles 410*a* have a relative large size d1, and the second nozzles 410*b* have a relatively small size d2. Both the first and second nozzles 410*a* and 410*b* are disposed sequentially in elongated groups (i.e., #1, #2, . . . , #n). As used herein, a "nozzle group" means a plurality of nozzles of the same size that are disposed in a straight line, and accordingly, it may be seen that first and second nozzle groups are formed in the bottom of each inkjet head 400.

As illustrated in the exemplary embodiment of FIG. 2, the inkjet head 400 includes first and second inkjet heads 400*a* and 400*b*, with both inkjet heads 400*a* and 400*b* being incorporated in the same head unit 700. A plurality of the large sized first nozzles 410*a* are formed in the first inkjet head 400*a*, and a plurality of the small sized second nozzles 410*b* are formed in the second inkjet head 400*b*.

Alternatively, as illustrated in the embodiment of FIG. 3, the larger first nozzles 410*a* and the smaller second nozzles 410*b* may be alternately disposed in a single line in one inkjet head 400. Again alternatively, as illustrated in FIG. 4, the large first nozzles 410*a* and the small second nozzles 410*b* may be respectively disposed in two parallel lines on opposite sides of one inkjet head 400.

The head unit 700 is operative to spray bead spacers 320 on the substrate 210 through the nozzles 410*a* and 410*b*, and the transfer unit 300 connected to the head unit 700 is operative to move the head unit 700 to selected positions relative to the upper surface of the underlying substrate 210. As illustrated in FIG. 1, the transfer unit 300 includes a support 310 for positioning the head unit 700 at a selected height above the substrate 210, a horizontal transfer part 330 for transferring the head unit 700 in the X and Y directions, and a lifter 340 for raising and lowering the head unit 700 in a direction orthogonal to the X and Y directions.

In order to print the bead spacers 320 at selected positions on the substrate 210 disposed on the stage 500, the bead spacers 320 are sprayed through the large and small nozzles 410a and 410b of the inkjet head 400 while the head unit 700 is moved in the X direction using the transfer unit 300. In a preferred embodiment, the bead spacers 320 are sprayed on top of a grid-like light blocking member 220 that is formed on the substrate 210.

In operation, a mixture 322a of large bead spacers 320a and an adhesive 321 are sprayed through the large first nozzles 410a of the inkjet head 400, and a mixture 322b of small bead spacers 320b and the adhesive 321 are sprayed through the small second nozzles 410b of the ink-jet head 400. The bead spacers 320a and 320b are made of an organic material having a low di-electric constant, such as an acrylic organic compound, Teflon, benzocyclobutene (BCB), cytop, or perfluorocyclobutene (PFCB) for forming a polymer. The adhesive 321 may be cured, or hardened, by the application of heat or ultraviolet light, and functions to attach the bead spacers 320a and 320b firmly to the substrate 210 at the respective positions at which they were printed.

As illustrated in FIG. 1, the supply unit 810 includes a first supply part 810a and a second supply part 810b. The first supply part 810a contains the mixture 322a of large bead spacers 320a and the adhesive 321, and the second supply part 810b contains the mixture 322b of small bead spacers 320b and the adhesive 321. A supply line 820 is provided between the supply unit 810 and the nozzles 410a and 410b to connect them together. The supply line 820 includes a first supply line 820a for connecting the first supply part 810a to the first nozzle 410a, and a second supply line 820b for connecting the second supply part 810b to the second nozzle 410b. The mixture 322a in the first supply part 810a is supplied to the first nozzle 410a through the first supply line 820a, and the mixture 322b in the second supply part 810b is supplied to the second nozzle 410b through the second supply line 820b.

An exemplary method for manufacturing an LCD using the exemplary bead spacer printing apparatus above is described in detail below in connection with FIGS. 5-7. FIG. 5 is a partial cross-sectional view of an LCD substrate 210, showing groups of bead spacers 320a and 320b being sprayed thereon with the apparatus, FIG. 6 is a partial cross-sectional view of the substrate 210 of FIG. 5, showing the bead spacers sprayed on the substrate being cured by the application of ultraviolet rays or heat, and FIG. 7 is a partial cross-sectional view of two LCD substrates 100 and 200 having sprayed-on groups of bead spacers 320a, 320b interposed therebetween.

Initially, as illustrated in FIG. 5, the mixture 322a of the first, large bead spacers 320a and the adhesive 321 and the mixture 322b of the second, small bead spacers 320b and the adhesive 321 are sprayed on the substrate 210 through the first and second nozzles 410a and 410b of the inkjet head 400, respectively. At this point in the process, leakage of light from the display panel can be prevented by printing the mixtures 322a and 322b in regions that correspond to the grid-like light blocking member 220 of the display panel. It is also preferable that the first and second spacer mixtures 322a and 322b be printed such that they do not overlap each other. The two mixtures 322a and 322b may be sprayed simultaneously, or consecutively, i.e., in alternative embodiments, the first bead spacers 320a may be sprayed on the substrate 210 first, and the second bead spacers 320b may be sprayed on the surface of the substrate 210 after the first are sprayed, or, vice-versa.

Figure 6:
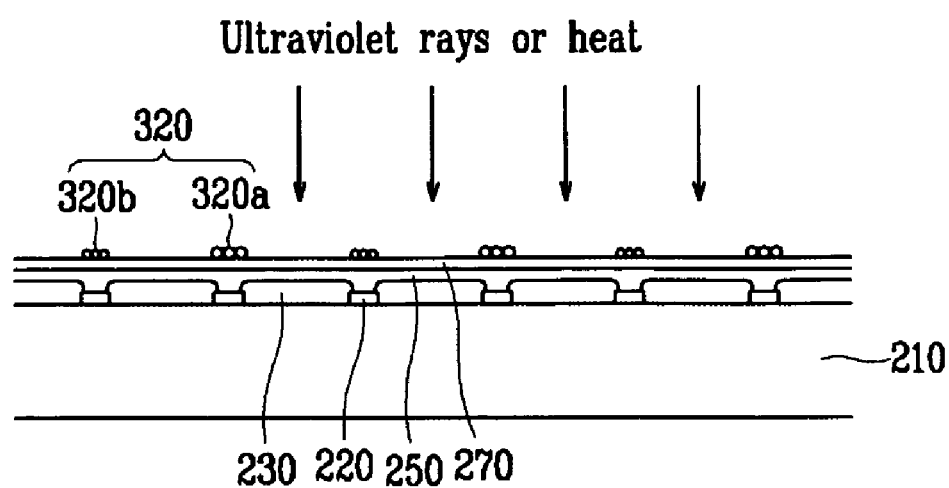
FIG. 6 is a partial cross-sectional view of the substrate of FIG. 5, showing the bead spacers sprayed on the substrate being cured by the application of ultraviolet light or heat.

Next, as illustrated in FIG. 6, the mixtures 322a and 322b that were sprayed on the substrate 210 are hardened and firmly attached to the substrate 210 by the application thereto of heat or light (for example, ultraviolet rays), such that only the groups of first and second bead spacers 320a and 320b remain.

Figure 7:
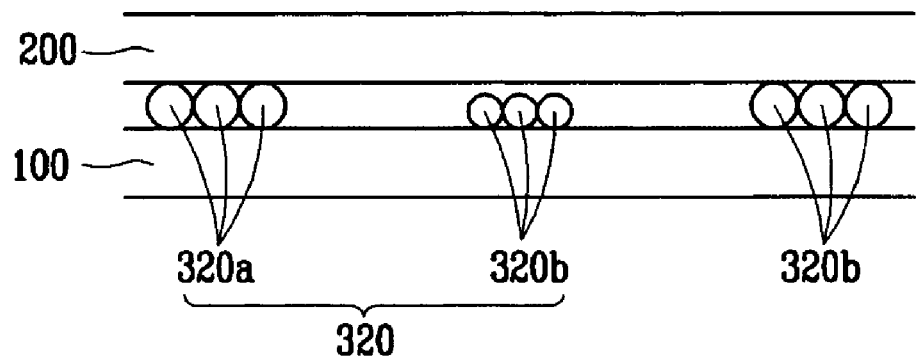
FIG. 7 is a partial cross-sectional view of two LCD substrates having groups of bead spacers interposed therebetween.

Then, as illustrated in FIG. 7, a common electrode substrate 200, including the substrate 210 on which the first and second bead spacers 320 are attached, is attached in spaced opposition to a thin film transistor (TFT) array substrate 100 under pressure. During this process, the large bead spacers 320a are deformed slightly so as to maintain the desired spacing, or cell space, between the two substrates of the display panel after the two substrates have been are assembled together with the liquid crystal material disposed therebetween. The small bead spacers 320b serve to prevent the occurrence of smear failures in the display in which larger spacers are damaged due to external pressures exerted by the supports of the display when a user applies a local pressure to the display during use.

Thus, as will be appreciated by those of skill in the art, the invention enables the advantages of both bead spacers, namely, a higher elasticity and a simpler process of application, and those of columnar spacers, namely, the elimination of light leakage from the display because of the selected positions on the display at which they are formed, to be obtained, without the disadvantages of either, in a simple, easily controlled process that provides stable yields.

Figure 8:
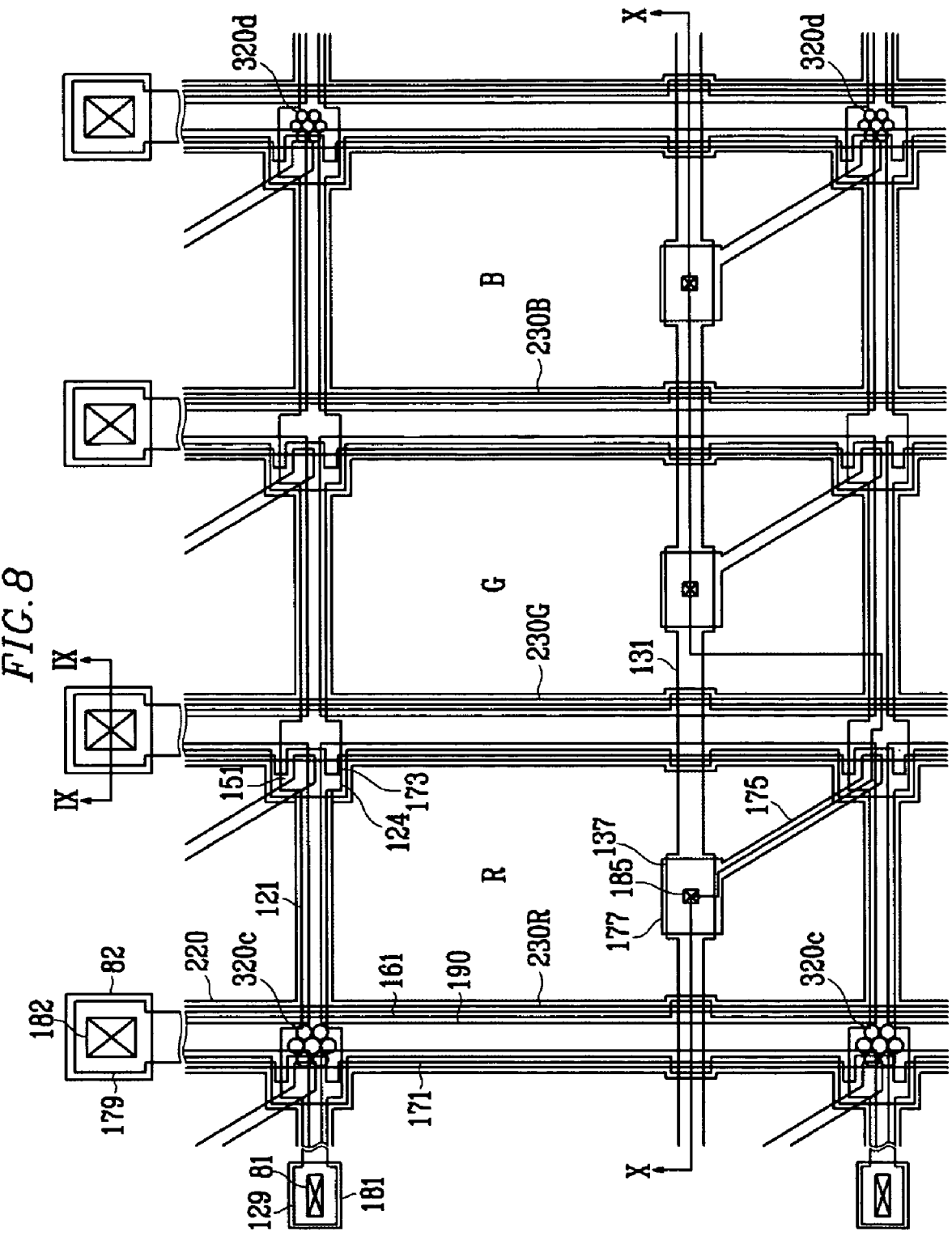
FIG. 8 is a partial top plan view of an LCD panel having bead spacers printed thereon by an exemplary embodiment of a method in accordance with the present invention.
Figure 9:
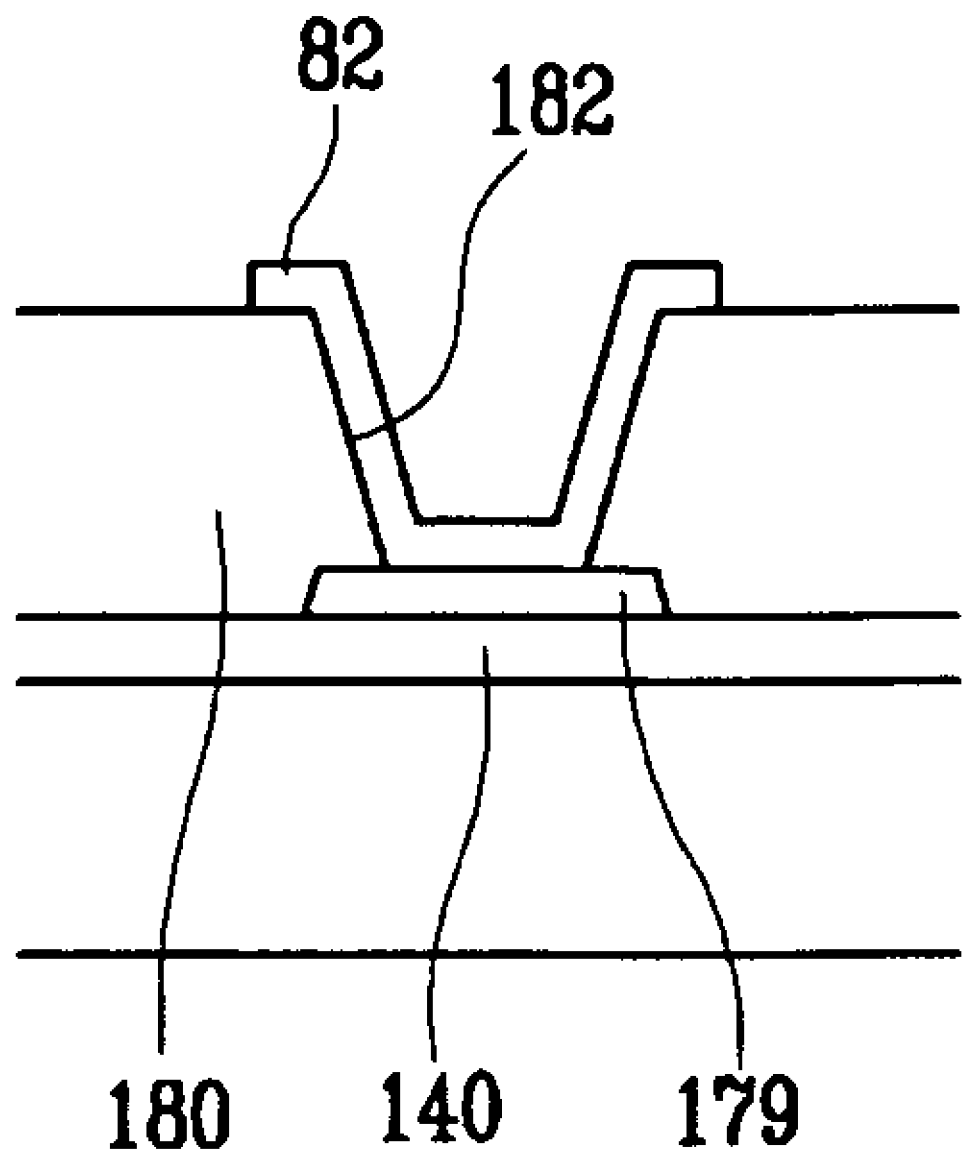
FIG. 9 is a partial cross-sectional view of the LCD taken along lines IX-IX of FIG. 8.
Figure 10:
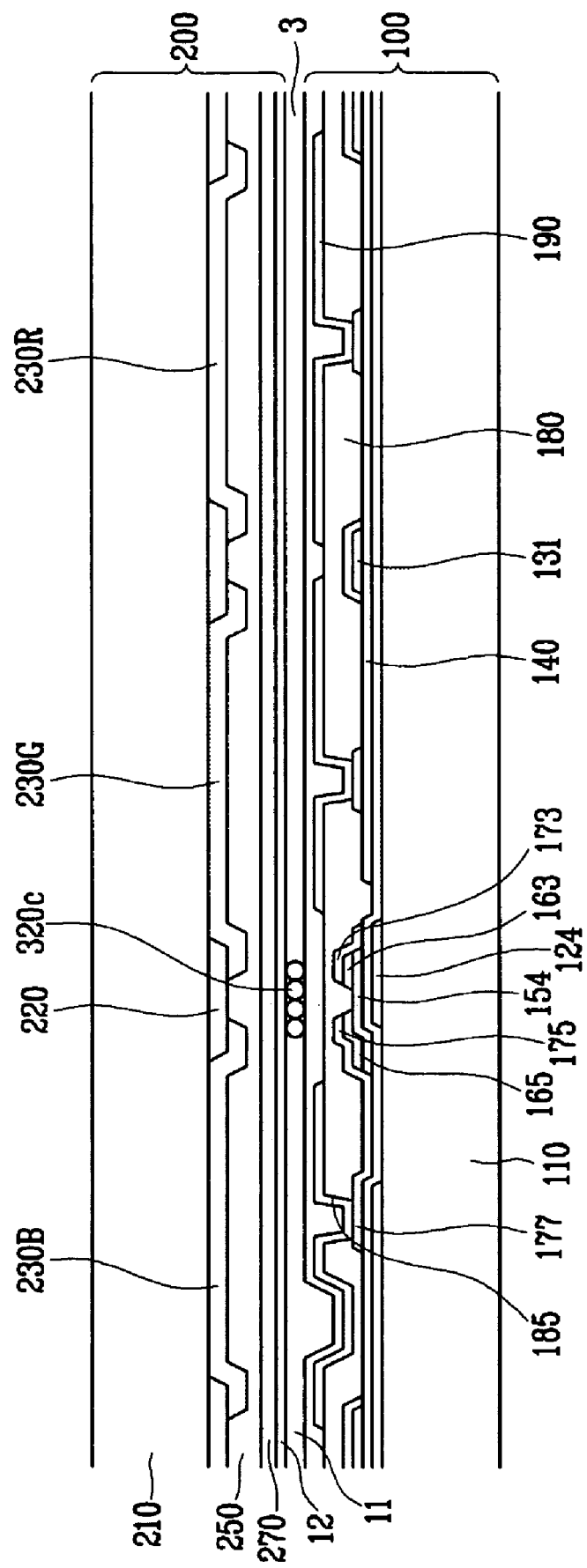
FIG. 10 is a partial cross-sectional view of the LCD taken along lines X-X of FIG. 8.

An exemplary embodiment of an LCD made with the methods and apparatus of the present invention is described below with reference to FIGS. 8-10, wherein FIG. 8 is a partial top plan view of an LCD panel having bead spacers printed thereon by an exemplary embodiment of a method in accordance with the present invention, FIG. 9 is a partial cross-sectional view of the panel taken along lines IX-IX of FIG. 8, and FIG. 10 is a partial cross-sectional view of the LCD taken along lines X-X of FIG. 8;

As illustrated in FIGS. 8-10, an LCD panel according to an exemplary embodiment of the present invention includes a thin film transistor array substrate 100 and a common electrode substrate 200 that are disposed in spaced opposition with each other, with a layer 3 of a liquid crystal material interposed between the two substrates.

The thin film transistor array substrate 100 includes a plurality of gate lines 121 and a plurality of storage electrode lines 131 formed on an insulating substrate 110 made of a transparent glass, plastic, or the like. The gate lines 121 each convey a gate signal, and extend generally in a horizontal direction. Each gate line 121 includes a plurality of gate electrodes 124 that protrude in a vertical direction, and a widened end part 129 for connecting to other layers or to an external driving circuit.

The storage electrode lines 131 receive predetermined voltages, such as a common voltage, and extend almost parallel to the gate lines 121. Each of the storage electrode lines 131 is disposed between two adjacent gate lines 121, and is positioned nearer to a lower one of the two gate lines 121. Each storage electrode line 131 includes a storage electrode 137 that extends in a vertical direction. A gate insulating layer 140 made of, e.g., silicon nitride (SiNx), or the like, is formed on the gate lines 121 and the storage electrode lines 131.

A plurality of semiconductor stripes 151, which are made of hydrogenated amorphous silicon ("a-Si"), polycrystalline silicon, or the like, are formed on the gate insulating layer 140. Each semiconductor stripe 151 is extends generally in a vertical direction, and includes a plurality of extensions 154 that extend toward the gate electrodes 124.

In the upper part of the semiconductor stripes 151, a plurality of ohmic contact stripes and islands 161 and 165, which are made of a material such as n+ hydrogenated amorphous silicon in which silicide or an n-type impurity is doped with a high concentration, are formed. The ohmic contact stripes 161 have a plurality of extensions 163, and the extensions 163 and the ohmic contact islands 165 are formed in associated pairs and are positioned on the extensions 154 of the semiconductor stripes 151.

A plurality of data lines 171 and a plurality of drain electrodes 175 are formed on the ohmic contacts 161 and 165 and the gate insulating layer 140. Each data line 171 is extends generally in a vertical direction and is insulated from and intersects the gate lines 121, and functions to convey a data voltage. Each data line 171 includes a wide end part 179 for connecting a plurality of source electrodes 173 that extend toward a drain electrode 175 and is bent in a 'C' shape to contact other layers or an external driving circuit. The drain electrode 175 is spaced apart from the data line 171 and is positioned at an opposite side of the gate electrode 124. The drain electrode 175 includes one widened end part 177 and one bar-shaped end part. The widened end part 177 is overlapped with the storage electrode 137 and a part of the bar-shaped end part is surrounded with the source electrode 173.

The gate electrodes 124, the source electrodes 173, the drain electrodes 175, and an extension 154 of the semiconductor stripes 151 constitute a plurality thin film transistors (TFTs), and a channel of the TFTs is formed in the extension 154 between the source electrode 173 and the drain electrode 175.

A passivation layer 180 is formed on the data line 171, the drain electrode 175, and the exposed portion 154 of the semiconductor stripe 151. The passivation layer 180 is made of an inorganic insulator, an organic insulator, or so on, and may have a flat surface. The passivation layer 180 has a contact hole 182 for exposing the widened end part 179 of the data line 171, and a contact hole 185 for exposing a part of the drain electrode 175. A plurality of contact holes 181 for exposing the end parts 129 of the gate lines 121 are formed in the passivation layer 180 and the gate insulating layer 140.

A plurality of pixel electrodes 190 and a plurality of contact assistants 81 and 82 are formed on the passivation layer 180. These may be made of a transparent conductive material, such as ITO or IZO, or of a reflective metal, such as aluminum, silver, chromium, or their alloys.

The pixel electrodes 191 are physically and electrically connected to the drain electrodes 175 through the contact holes 185 and receive a data voltage from the drain electrodes 175. A pixel electrode 191 to which the data voltage is applied and a common electrode 270 of a common electrode display panel 200 that receives a common voltage generate an electric field, thereby determining the orientation of the molecules of the liquid crystal layer 3 disposed between the two electrodes. The polarization of light passing through the liquid crystal layer 3 changes, depending on the orientation of liquid crystal molecules. Because the pixel electrode 191 and the common electrode 270 constitute a capacitor (referred to herein as a "liquid crystal capacitor"), they maintain an applied voltage even after the TFT is turned off.

The pixel electrode 191 and the drain electrode 175 connected thereto are overlapped with the storage electrodes 133a and 133b and the storage electrode line 131. A capacitor, which comprises the pixel electrode 191 and the drain electrode 175 electrically connected thereto are overlapped with the storage electrode line 131, is referred to as a storage capacitor, and functions to enhance the voltage storage capability of the liquid crystal capacitors.

The contact assistants 81 and 82 are connected to an end part 129 of the gate line 121 and an end part 179 of the data line 171 through the contact holes 181 and 182, respectively. The contact assistants 81 and 82 supplement the adhesion between the end part 129 of the gate line 121 and the end part 179 of the data line 171 and an external apparatus, and also serve to protect them. A lower alignment layer 11 for aligning the molecules of the liquid crystal layer 3 is formed on the pixel electrodes 190 and the passivation layer 180.

As illustrated in FIG. 10, the upper, common electrode substrate 210, which is made of transparent glass, plastic, or the like, is positioned above the lower alignment layer 11 and spaced apart from it by a selected distance. A light blocking member 220 for blocking light leakage between the pixel electrodes 190 is formed in a grid, or matrix shape on the upper substrate 210.

The light blocking member 220 is disposed opposite to the pixel electrodes 190, and has a plurality of openings which have substantially the same shape as respective ones of the pixel electrodes 190. The light blocking member 220 also includes opaque, or light-blocking parts corresponding to the gate lines 121, the data lines 171 and the TFTs.

A plurality of red, green, and blue color filters 230R, 230G, and 230B are also formed on the substrate 210. Most of the color filters 230R, 230G, and 230B exist within a region that is surrounded with the light blocking member 220, and may extend in a vertical direction along a line of the pixel electrodes 190. The color filters 230R, 230G, and 230B may alternatively be adapted to display colors other than red, green or blue.

An overcoat 250 is formed on the light blocking member 220 and the color filters 230R, 230G, and 230B. The overcoat 250 may be made of an organic insulator, prevents the color filters 230 from being exposed, and provides a flat surface. In some alternative embodiments, the overcoat 250 may be omitted.

The common electrode 270, which is made of a transparent conductor, such as ITO and IZO, is formed on the overcoat 250. An upper alignment layer 12 is formed on the common electrode 270. Both the lower alignment layer 11 and the upper alignment layer 12 may be a horizontal alignment layer or a vertical alignment layer.

As illustrated in FIG. 8, a plurality of large bead spacers 320c and a plurality of small bead spacers 320d are printed on the upper alignment layer 12. The bead spacers 320c and 320d are preferably printed in a region corresponding to the light blocking member 220. In the exemplary embodiment illustrated, 6 to 8 bead spacers disposed in a generally circular shape constitute one group of the spacers, and are disposed in regions corresponding to the TFTs of the thin film transistor array substrate 100. Alternatively, the respective bead spacers 320c and 320d of the bead spacer groups may be substantially equal in size.

As used herein, a "bead spacer group" means a plurality of bead spacers 320c that are disposed in a single group. The number of bead spacers that may be included in a bead spacer group can be varied. For example, a group can consist of only one bead spacer, or alternatively, a single group can include 4 to 8 bead spacers. Additionally, the density of the bead spacers 320c can be varied, but in general, are formed at ⅙ of the pixel density. By "density" is meant the number of bead spacers 320c that are formed in a single group on the substrate, and "⅙ of the pixel density" means that a group of bead spacers is formed at every sixth pixel electrode 190. Thus, a plurality of large bead spacers 320c may be formed on a substrate at ⅙ of the pixel density and a plurality of small bead spacers 320d may also formed on the same substrate at ⅙ of the pixel density. As a result, in an LCD of the present invention, the bead spacers may be formed at ⅓ (i.e., ⅙+⅙=⅓) of the pixel density.

The large bead spacers 320c contact both display panel substrates 100 and 200, but the small bead spacers 320d act to maintain a selected minimum spacing from the common electrode panel 200. Printing bead spacers of different sizes on the display substrates thus enables the prevention of smear failures in the display and increases the allowable tolerance in the amount of the liquid crystal that must be disposed in the panel for correct operation.

Figure 11:
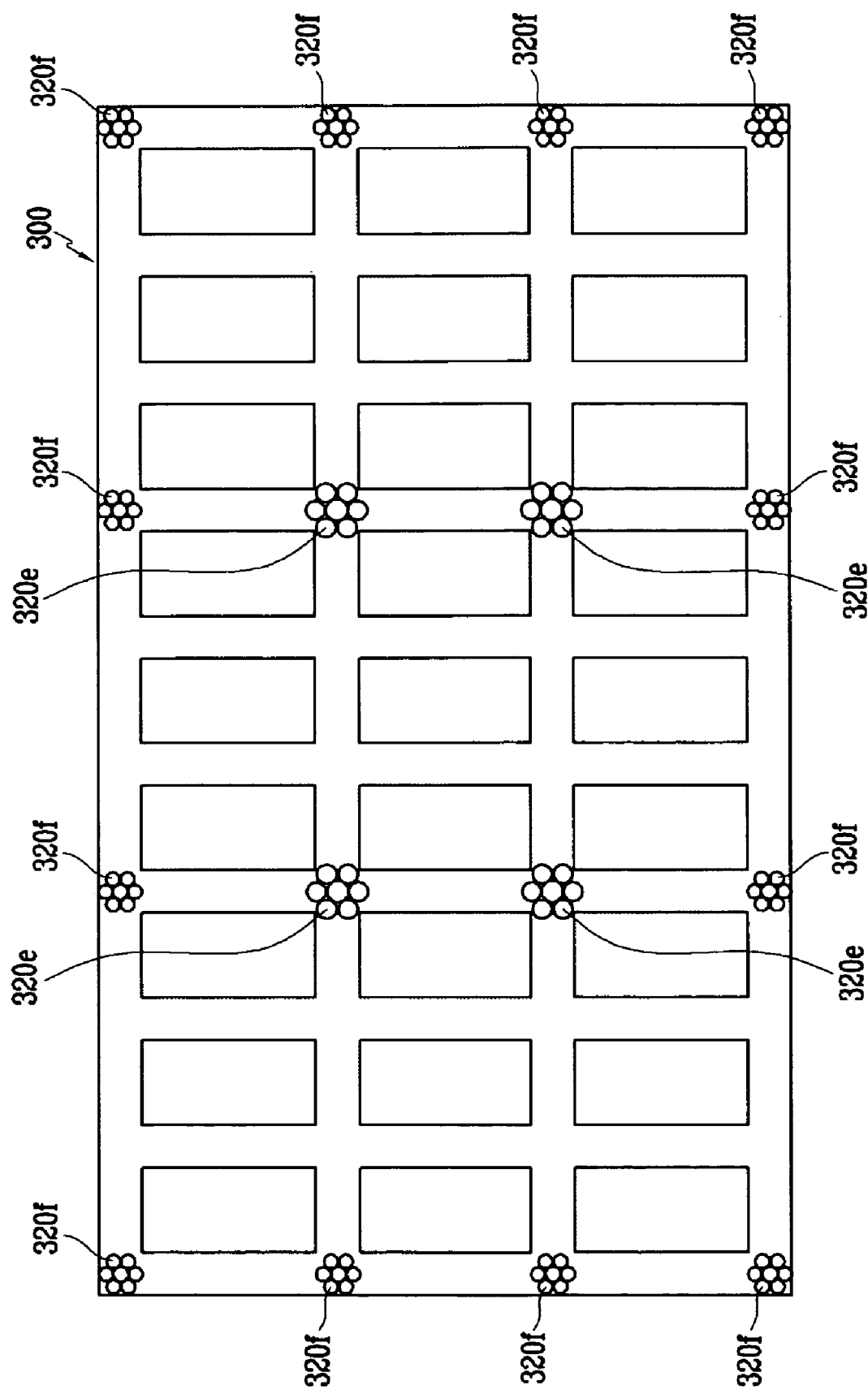
FIG. 11 is a top plan view of a substrate of an LCD on which bead spacers have been printed by another exemplary embodiment of a method in accordance with the present invention.

FIG. 11 is a top plan view of a substrate 300 of an LCD display panel on which bead spacers have been printed by another exemplary embodiment of the present invention. As illustrated in FIG. 11, small bead spacers 320f are printed at a peripheral part of the substrate 300, and large bead spacers 320e are disposed at a central part of the substrate. The bead spacers 320e and 320f are formed in regions corresponding to the light blocking member, and are preferably disposed in circular groups of 6 to 8 bead spacers each.

In the exemplary embodiment of FIG. 1, the large bead spacers 320e are formed at ⅙ of the pixel density and the small bead spacers 320f are also formed at ⅙ of the pixel density. As a result, the bead spacers 320e and 320f together are formed at ⅓ of the pixel density of the LCD. In such an LCD, because higher pressures exist at the central part of the substrate 300 than at a peripheral part thereof, the size of the cell gap at the central part of the substrate 300 tends to decrease relative to that at the outer part of the substrate. However, since the size of the bead spacers 320e disposed at the central part of the substrate 300 are larger than that of the bead spacers 320f disposed at the peripheral part thereof, the bead spacers 320e that are disposed in the central part are compressed more, thereby functioning to maintain a uniform cell gap over the entire substrate 300.

In another scenario, during the process of filling the panel with the liquid crystal material, the liquid crystal material flows out into the peripheral part of the substrate 300, and the peripheral part of the substrate 300 may therefore have a cell gap that is larger than that at the central part of the substrate 300. Accordingly, the differently sized bead spacers 320e and 320f that are distributed within the substrate 300 can be disposed differently than that discussed above, and as needed to accommodate this difference in cell gap size. That is, bead spacers 320e having a large size may be disposed at the peripheral part of the substrate 300 and the bead spacers 320f having a small size may be disposed at the central part thereof the substrate 800 to accommodate this difference in cell gap size. Alternatively, bead spacers having the same size but made with different material so as to have different elasticities may be disposed in the respective portions of the display panel to accommodate the cell gap difference.

Figure 12:
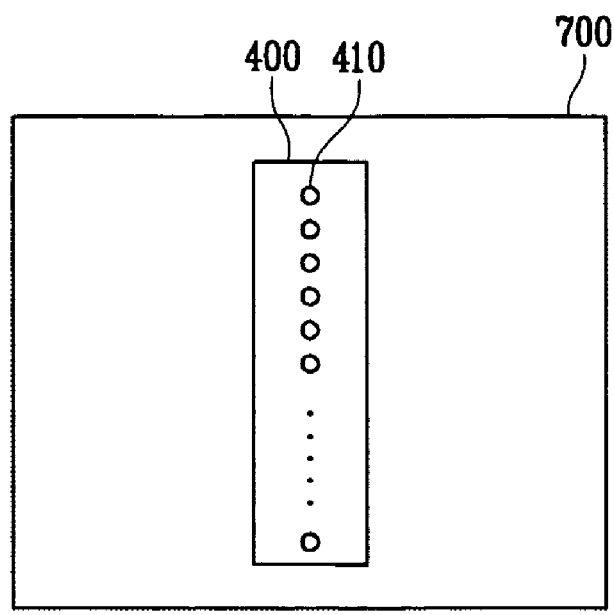
FIG. 12 is a bottom plan view of another exemplary embodiment of a head unit of an apparatus for printing bead spacers in accordance with the present invention; and, FIG. 13 is a partial cross-sectional view of two LCD substrates having a group of bead spacers with different sizes disposed therebetween.

In the exemplary embodiments discussed above, the sizes of the respective bead spacers of the spacer groups were the same, but it should be understood that it is possible for a nozzle of one inkjet head to spray groups of spacers in which the size and/or material of the spacers in the group are different from each other. FIG. 12 is a bottom plan view of another exemplary embodiment of a head unit of an apparatus for printing bead spacers in accordance with the present invention. As illustrated in FIG. 12, only one inkjet head 400 is provided in the head unit 700 of the exemplary apparatus. The inkjet head 400 includes a plurality of nozzles 410 having the same size formed in the bottom thereof. In this embodiment, two or even more types and/or sizes of bead spacers may be contained in the bead spacer groups that are sprayed through each of the nozzles 410. For example, bead spacers having two or more different sizes may be included in each bead spacer group, and bead spacers made of two or more different materials may be included in each group.

Figure 13:
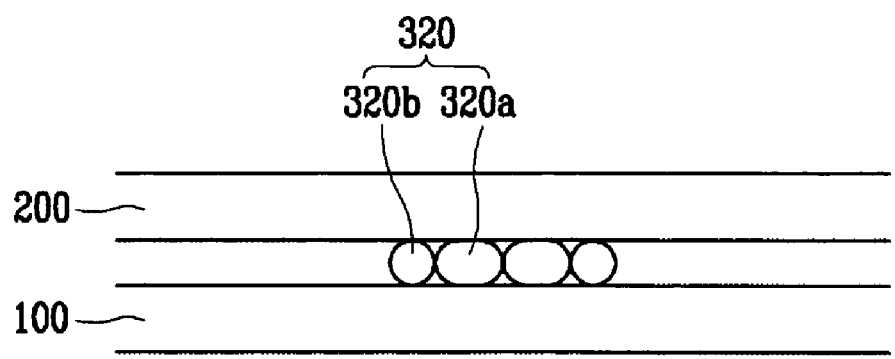

FIG. 13 is a partial cross-sectional view of two LCD substrates 100 and 200 having a group of bead spacers with different sizes disposed therebetween. As illustrated in FIG. 13, the large bead spacers 320a maintain the cell space between two display panels due to their deformation when the two substrates are coupled together under pressure after the liquid crystal material has been applied to one of the substrates. As a result of this arrangement, when a user of the panel applies a localized pressure to the display panel during use, the smaller sized bead spacers 320b function to support the two display panels, thereby preventing a smear failure of the display in which the larger bead spacers are over-compressed and potentially damaged by the pressure.

Thus, as discussed above, the invention enables the advantages of both bead spacers, which have a higher elasticity and are simpler to apply, and those of columnar spacers, namely, the elimination of display light leakage, to be realized in a panel of an LCD without experiencing the disadvantages of either, in a simple, easily controlled process that provides stable yields.

According to the exemplary embodiments of the methods and apparatus of the invention described and illustrated herein, bead spacers having the same or different sizes and materials are printed in groups at selected positions on a substrate of an LCD panel with an inkjet head such that the cell gap of the panel is maintained substantially uniform throughout the panel, the occurrence of smear failures in the panel are prevented, and the allowable tolerance in the amount of liquid crystal material needed to correctly fill the panel is increased.

By now, those of skill in this art will appreciate that many modifications, substitutions and variations can be made in and to the spacer printing methods and apparatus of the present invention and their advantageous application to the manufacture of LCD substrates without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A method for manufacturing an flat panel display, the method comprising:
   spraying a first bead spacer group on a first substrate through a first nozzle group of a head unit;
   spraying a second bead spacer group on the first substrate through a second nozzle group of the head unit; and,
   coupling a second substrate in spaced opposition to the first substrate.

2. The method of claim 1, wherein the head unit includes one or more inkjet heads.

3. The method of claim 2, wherein the first nozzle group is formed in one inkjet head of the head unit and the second nozzle group is formed in another inkjet head of the head unit.

4. The method of claim 2, wherein the first nozzle group and the second nozzle group are formed in one inkjet head.

5. The method of claim 1, further comprising supplying the first and second bead spacers to the head unit from respective ones of first and second supply units.

6. The method of claim 1, wherein the first and second bead spacer groups are sprayed on the first substrate together with an adhesive.

7. The method of claim 6, wherein the adhesive is a thermosetting or an ultraviolet curing adhesive.

8. The method of claim 7, further comprising applying heat or ultraviolet light to the first substrate after spraying the first and second bead spacer groups thereon to cure the adhesive.

9. The method of claim 1, wherein the first bead spacer group includes a plurality of first bead spacers and the second bead spacer group includes a plurality of second bead spacers, and the respective sizes, materials, or both the respective sizes and materials of the first bead spacers and the second bead spacers are different from each other.

10. The method of claim 1, wherein the first and second bead spacer groups are sprayed on a light blocking member and such that they do not overlap each other.

11. The method of claim 10, wherein the first bead spacer group is positioned in a central part of the first substrate and the second spacer group is positioned in a peripheral part of the first substrate.

12. The method of claim 10, wherein the density of the first bead spacer group is about ⅙ of a pixel density of the first substrate, the density of the second bead spacer group is about ⅙ of the pixel density, and the first and second bead spacer groups are spaced apart from each other by a selected distance.

13. A method for manufacturing an flat panel display, the method comprising:

supplying at least two kinds of bead spacers from a supply unit;

spraying the at least two kinds of bead spacers on a first substrate of the flat panel display through a nozzle of a head unit that is connected to the supply unit; and, coupling a second substrate in spaced opposition to the first substrate.

* * * * *